United States Patent [19]

Borromeo

[11] Patent Number: 4,951,525
[45] Date of Patent: Aug. 28, 1990

[54] HANDLEBARS FOR CYCLES, PARTICULARLY BICYCLES FOR TRIATHLONS AND SPEED TRIALS

[75] Inventor: Lucio Borromeo, Turin, Italy
[73] Assignee: 3T S.p.A., Turin, Italy
[21] Appl. No.: 364,044
[22] Filed: Jun. 9, 1989

[30] Foreign Application Priority Data

Dec. 13, 1988 [IT] Italy .................... 68105 A/88

[51] Int. Cl.⁵ .......................... B62K 21/12
[52] U.S. Cl. ..................... 74/551.1; 74/551.8; 280/261
[58] Field of Search ............... 74/551.1, 551.3–551.9; 280/279, 280, 261; D12/178 X

[56] References Cited

U.S. PATENT DOCUMENTS

| 586,678 | 7/1897 | Walsh | 74/551.8 |
| 602,016 | 4/1898 | Johnson | 74/551.1 |
| 944,932 | 12/1909 | Abraham | 74/551.8 |
| 1,448,921 | 3/1923 | Ershkowitz | 74/551.8 |
| 1,738,855 | 12/1929 | Thompson | 74/551.1 |
| 2,059,669 | 11/1936 | Skoog | 74/551.1 |
| 2,816,775 | 12/1957 | Costello | 74/551.8 |
| 3,529,490 | 9/1970 | Pawsat et al. | 74/551.1 |
| 4,630,502 | 12/1986 | Greco | D12/178 X |
| 4,750,754 | 6/1988 | Lennon | 280/261 |

FOREIGN PATENT DOCUMENTS

| 3143266 | 5/1983 | Fed. Rep. of Germany | 74/551.1 |
| 337964 | 5/1904 | France | 74/551.1 |
| 12218 | 4/1897 | United Kingdom | 74/551.1 |
| 20343 | 9/1897 | United Kingdom | 74/551.1 |
| 2138755 | 10/1984 | United Kingdom | 74/551.1 |

Primary Examiner—Vinh T. Luong
Attorney, Agent, or Firm—Sughrue, Mion, Zinn, Macpeak & Seas

[57] ABSTRACT

Cycle handlebars include a transverse element which can be connected centrally to a steering pillar and has two side extensions which extend forwardly and converge inwardly of the handlebars. Two further extensions extend upwardly from the side extensions and are connectd by a further transverse element. The handlebars, which preferably have a generally loop-like configuration, thus provide at least four different gripping portions.

6 Claims, 2 Drawing Sheets

HANDLEBARS FOR CYCLES, PARTICULARLY BICYCLES FOR TRIATHLONS AND SPEED TRIALS

BACKGROUND OF THE INVENTION

The present invention relates to handlebars for cycles and has been developed with particular attention to its possible use on bicycles for use by athletes engaged in triathlons and speed trials.

In this field of use, as well as more conventional handlebar-gripping positions, it is particularly important to be able to offer positions in which the athlete can keep his body upright, so as to be able to improve the ventilation of the lungs (for example, after a swimming contents), and at least one support or rest position.

SUMMARY OF THE INVENTION

According to the present invention, this object is achieve by virtue of a handlebar, particularly for triathlon bicycles, comprise:

a transverse element which can be connected centrally to a steering column so as to define two first gripping portions of the handlebar, two side extensions of the transverse element, one for each side of the transverse element, which extend forwardly and converge inwardly of the handlebar so as to define two second gripping portions of the handlebar, two further side extensions each forming an extension of a respective side extension so as to define two third gripping portion of the handlebar, and a further transverse element connecting the further side extensions so as to define two fourth gripping portions of the handlebar.

BRIEF DESCRIPTION OF THE DRAWINGS

The invention will now be described, purely by way of non-limiting example, with reference to the appended drawings in which.

DETAILED DESCRIPTION OF THE INVENTION

Figure 1:
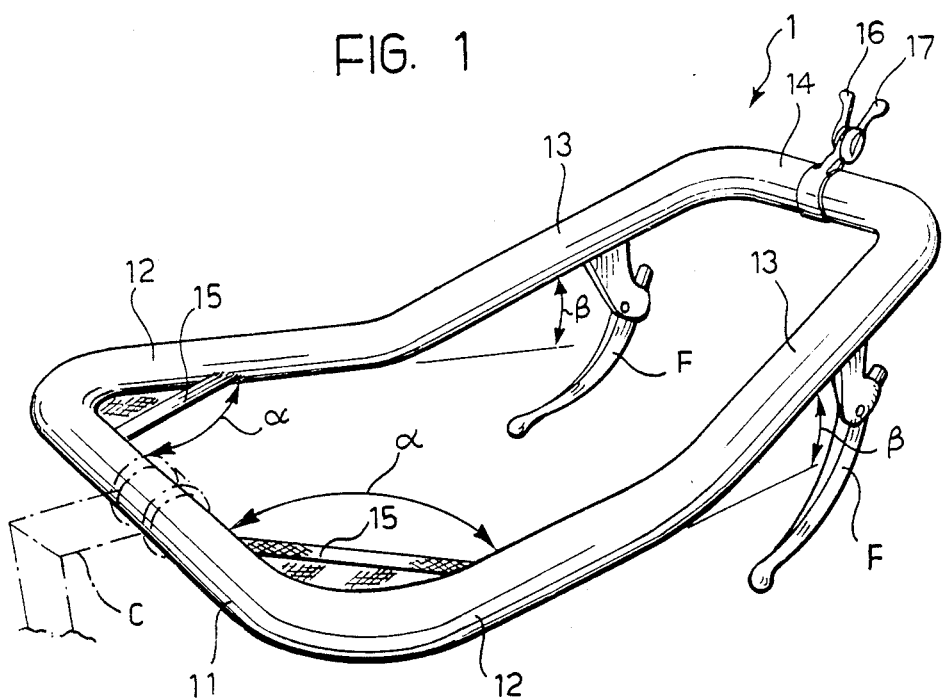
FIG. 1 is a schematic perspective view of a handlebar according to the invention.

The handlebars in question, generally indicated 1, is intended for mounting on the steering pillar of a bicycle (not illustrated as a whole) by means of a support or stem C, shown schematically in broken outline. Preferably, as can be seen, the bicycle in question is for use by an athlete competing in a triathlon.

The handlebar 1 as a whole has a generally loop-like structure (closed or possibly open at its front end) which is specularly symmetrical about the vertical plane identified by its position of mounting on the steering pillar C. The handlebar 1 can therefore be seen to be constituted theoretically by two C-shaped arms which extend with mirror symmetry relative to that plane.

In general, the handlebar 1 is constituted by a metal tube of the type currently used for making cycle handlebars, shaped by means of normal bending technology and provided with an outer covering of plastics, imitation leather, etc.

More specifically, within the handlebar 1 can be distinguished:

a first element or transverse body 11 for connection centrally to the steering column C, two first side extensions 12 which extend forwardly from the transverse element 11 on its two sides and converge inwardly of the handlebar at an angle $\alpha$ of the order of 60–75°, two further side extensions 13 each constituting an extension of one of the extensions 12; the two further extensions 13 therefore maintain the general angle of convergence inwardly of the handlebar but extend upwardly at an angle $\beta$ (defined with respect to the plane identified by the element 11 and the extensions 12) of the order of 20–30°, and a further, front transverse element 14 connecting the extensions 13 so as to give the handlebar a generally loop-like structure (which is possibly open in correspondence with the central part of the element 14).

The distance between the transverse elements 11 and 14 is of the order of approximately 34–40 cm and is therefore greater than the normal length of the forearms of an athlete using the handlebar 1.

The width of the front transverse element 14, however, is of the order of approximately 25 cm.

In practice, the four sections 11 to 14 of the two arms of the handlebar 1 define four respective gripping portions of the handlebar.

Figure 2:
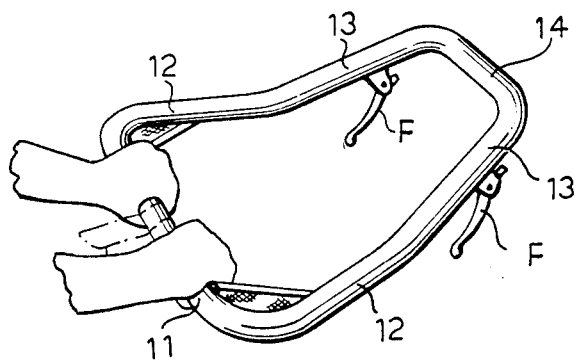
FIGS. 2 to 5 show schematically four different possible gripping positions of the handlebar according to the invention.
Figure 3:
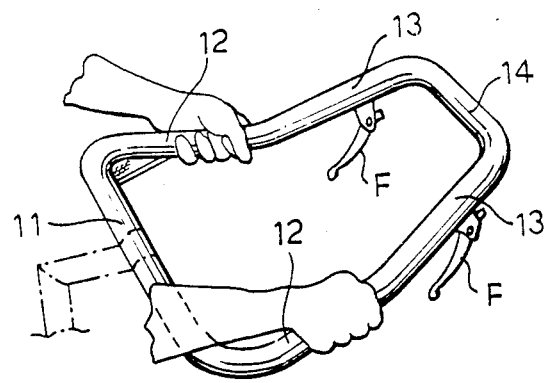
Figure 4:
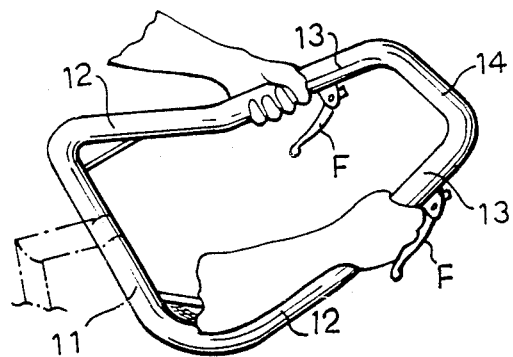
Figure 5:
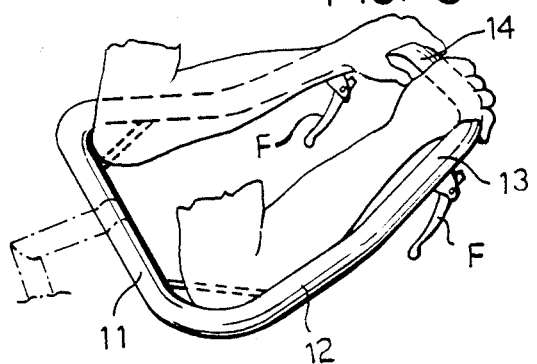

The athlete using the handlebar 1 therefore has available:

a first gripping position (FIG. 2) achieved by gripping the handlebar 1 in correspondence with the transverse element 11: this is a gripping position more or less comparable to that achieved with conventional racing handlebar under normal travelling conditions, a second gripping position (FIG. 3) achieved by gripping the handlebar 1 in correspondence with the side extensions 12: in this position, as a result of the generally upwardly-inclined mounting of the handlebar 1, the athlete can easily straighten his body so as to facilitate the ventilation of the lungs, for example, after a swimming race in a triathlon competition, a third gripping position (FIG. 4) achieved by gripping the handlebar. 1 in correspondence with the further extensions 13: this position to a certain extent represents a compromise between the need to straighten the body to facilitate the ventilation of the lungs and the need to retain a certain aerodynamic travelling position; it is therefore a position which can be used, for example, during the critical stages of the cycling competition: for this reason, the brake levers F are usually mounted on the handlebar 1 in correspondence with the portions 13, and a fourth gripping position (FIG. 5) achieved by gripping the handlebar in correspondence with the front element 14; in this position, the athlete's forearms project inwardly of the handlebar 1 (as will be remembered, the distance between the transverse elements 11 and 14 is greater than the length of the forearms): in order to prevent the forearms from, so to speak, floating, with the tiring which would obviously result, support formations 15 are provided within the handlebar 1, in the regions of the connections between the transverse element 11 and the side extensions 12, and are constituted, for example, by small pieces of soft material (for example, cloth, imitation leather) or shaped parts having a generally cup-shaped configuration, within which the athlete can support his elbows. In such travelling conditions, that is, with the forearms lying within the handlebar 1 which are gripped in correspondence with the element 14, the athlete can assume a general resting position, for example, to consume food or drink whilst travelling.

To advantage, the central portion of the front transverse element 14 of the handlebar may be used for mounting the front 16 and rear 17 derailer controls (gear changes).

Naturally, the principle of the invention remaining the same, the forms of embodiment and details of construction may be varied widely with respect to those described and illustrated, without thereby departing from the scope of the present invention.

I claim:

1. A handlebar for cycles, particularly but no exclusively for bicycles for triathlons and speed trails, comprising:
   a transverse element adapted to be connectible centrally to a steering column of a cycle so as to define two first gripping portions of the handlebar,
   two side extensions of the transverse element, one at each side of the transverse element, extending forwardly and converging inwardly of the handlebar so as to define two second gripping portions of the handlebar,
   two further side extensions each forming an inwardly converging extension of a respective side extension so as to define two third gripping portions of the handlebar, and
   a further transverse element connecting the further side extensions so as to define two fourth gripping portions of the handlebar.

2. A handlebar according to claim 1, wherein the further transverse element is substantially without a break, so that the handlebar as a whole has a generally closed, loop-like structure.

3. A handlebar according to claim 1, wherein elbow support means are provided in regions of the connections between the transverse element and the two side extensions for supporting an athlete s elbows when the athlete grips said further transverse element.

4. A handlebar according to claim 1, wherein the side extensions converge inwardly of the handlebar at an angle of the order of 60-75°.

5. A handlebar according to claim 1, wherein the further side extensions extend upwardly at an angle of the order of 15-14 20° with respect to a plane defined by the transverse element and the side extensions.

6. A handlebar according to claim 1, wherein brake-operating levers are provided and are associated with the further extensions.

* * * * *